US007585148B2

(12) United States Patent
Hoell

(10) Patent No.: US 7,585,148 B2
(45) Date of Patent: Sep. 8, 2009

(54) NON-POSITIVE-DISPLACEMENT MACHINE AND ROTOR FOR A NON-POSITIVE-DISPLACEMENT MACHINE

(75) Inventor: Harald Hoell, Wachtersbach (DE)

(73) Assignee: Siemens Aktiengesellschaft, Munich (DE)

( * ) Notice: Subject to any disclaimer, the term of this patent is extended or adjusted under 35 U.S.C. 154(b) by 465 days.

(21) Appl. No.: 10/593,030

(22) PCT Filed: Mar. 10, 2005

(86) PCT No.: PCT/EP2005/002559

§ 371 (c)(1), (2), (4) Date: Sep. 15, 2006

(87) PCT Pub. No.: WO2005/093219

PCT Pub. Date: Oct. 6, 2005

(65) Prior Publication Data

US 2008/0159864 A1 Jul. 3, 2008

(51) Int. Cl.
*F03D 11/00* (2006.01)

(52) U.S. Cl. .................... 415/115; 415/176; 415/199.5

(58) Field of Classification Search ................ 415/109, 415/115, 176, 199.5; 416/170 R, 198 A, 416/198 R, 201 R
See application file for complete search history.

(56) References Cited

U.S. PATENT DOCUMENTS

| | | | | | |
|---|---|---|---|---|---|
| 2,452,782 | A | * | 11/1948 | Cristall | 416/201 R |
| 2,741,454 | A | * | 4/1956 | Eppley | 416/244 R |
| 2,858,101 | A | * | 10/1958 | Alford | 416/97 R |
| 2,861,823 | A | | 11/1958 | Perry | |
| 3,059,901 | A | * | 10/1962 | Snow et al. | 415/134 |
| 3,867,063 | A | * | 2/1975 | Bulavin et al. | 415/199.5 |
| 4,173,120 | A | * | 11/1979 | Grosjean et al. | 60/791 |
| 4,184,797 | A | * | 1/1980 | Anderson et al. | 416/95 |
| 4,292,008 | A | * | 9/1981 | Grosjean et al. | 415/115 |
| 4,795,307 | A | * | 1/1989 | Liebl | 415/115 |
| 5,054,996 | A | * | 10/1991 | Carreno | 415/115 |
| 5,314,303 | A | * | 5/1994 | Charbonnel et al. | 415/173.1 |
| 5,755,556 | A | * | 5/1998 | Hultgren et al. | 416/96 R |
| 5,860,789 | A | * | 1/1999 | Sekihara et al. | 416/201 R |
| 6,053,701 | A | * | 4/2000 | Ichiryu et al. | 416/96 R |
| 6,094,905 | A | * | 8/2000 | Fukuyama | 60/806 |
| 6,464,461 | B2 | * | 10/2002 | Wilson et al. | 416/96 R |
| 6,491,495 | B1 | * | 12/2002 | Marushima et al. | 416/96 R |

(Continued)

FOREIGN PATENT DOCUMENTS

| | | |
|---|---|---|
| DE | 1023933 | 2/1958 |

(Continued)

*Primary Examiner*—Edward Look
*Assistant Examiner*—Aaron R Eastman

(57) ABSTRACT

The invention relates to a rotor for a non-positive-displacement machine provided with a hollow shaft, which is arranged coaxial to the rotation axis, is supported, on both sides and on the face, on two axially opposed sections of the rotor, and which encloses an inner hollow space. In order to provide a rotor for a non-positive-displacement machine, which has a higher serviceable life and is less susceptible to mechanical defects, the invention provides that the hollow shaft, in the axial direction of the rotor, is formed from a number of adjoining rings, and the rings are outwardly sealed against one another an with regard to the sections of the hollow space. Each ring has an I-shaped cross-section and the web of the I shape extends in the radial direction of the rotor.

13 Claims, 5 Drawing Sheets

U.S. PATENT DOCUMENTS

| | | | | |
|---|---|---|---|---|
| 6,499,945 | B1 * | 12/2002 | Lathrop | 416/198 A |
| 6,746,208 | B2 * | 6/2004 | Marushima et al. | 416/96 R |
| 7,114,915 | B2 * | 10/2006 | Uematsu et al. | 415/115 |
| 2002/0182073 | A1 * | 12/2002 | Takahashi et al. | 416/96 R |
| 2003/0035727 | A1 * | 2/2003 | Marushima et al. | 416/97 R |
| 2003/0133786 | A1 * | 7/2003 | Uematsu et al. | 415/115 |
| 2003/0143065 | A1 * | 7/2003 | Takahashi et al. | 415/115 |
| 2004/0170494 | A1 * | 9/2004 | Marushima et al. | 415/115 |
| 2004/0191056 | A1 * | 9/2004 | Takahashi et al. | 415/115 |

FOREIGN PATENT DOCUMENTS

| | | |
|---|---|---|
| EP | 0 965 726 A1 | 12/1999 |
| GB | 599809 | 3/1948 |
| GB | 661078 | 11/1951 |
| GB | 836920 | 6/1960 |
| JP | 63253125 | 10/1988 |

* cited by examiner

NON-POSITIVE-DISPLACEMENT MACHINE AND ROTOR FOR A NON-POSITIVE-DISPLACEMENT MACHINE

CROSS REFERENCE TO RELATED APPLICATIONS

This application is the US National Stage of International Application No. PCT/EP2005/002559, filed Mar. 10, 2005 and claims the benefit thereof. The International Application claims the benefits of European Patent application No. 04006393.5 filed Mar. 17, 2004. All of the applications are incorporated by reference herein in their entirety.

FIELD OF THE INVENTION

The invention refers to a rotor for a turbo-engine with a hollow shaft installed coaxially to its rotational axis, which on both sides on the end face is supported on two axially oppositely disposed sections of the rotor, encloses an inner central cavity, and in the axial direction of the rotor is formed from a plurality of abutting rings so that the rings reciprocally abutting and abutting upon the sections externally define the cavity. In addition, the invention refers to a turbo-engine with such a rotor.

BACKGROUND OF THE INVENTION

Gas turbines and their principles of operation are generally known. In relation to this, FIG. 4 shows a gas turbine 1 which has a compressor 5, a combustion chamber 6 and a turbine unit 11 installed along a rotor 3 rotatably mounted around a rotational axis 2. In the compressor 5 and also in the turbine unit 11 stator blades 12,35 are fastened on the casing and rotor blades 15,37 are fastened on the rotor 3, each with the forming of blade rings 17,19,36,38. A stator blade ring 19,36 forms with the rotor blade ring 17,38 a compressor stage 21 or a turbine stage 34 respectively, wherein a plurality of stages are connected one behind the other. The rotor blades 15 of a ring 17,38 are fastened on the rotor 3 by means of an annular, centrally perforated disk 26,39. Extending through the central opening in the axial direction is a central tension bolt 7 which clamps together the turbine disks 39 and compressor disks 26. In addition, a hollow shaft 13 is installed to bridge the distance originating from the combustion chamber 6, between the compressor 5 and turbine unit 11, between the compressor disk 26 of the last compressor stage 21 and the turbine disk 39 of the first turbine stage 34.

During the running of the gas turbine 1 the compressor 5 draws in ambient air and compresses this. The compressed air is mixed with a fuel and fed to the combustion chamber 6 in which the mixture is combusted into a hot working medium M. The latter flows from out the combustion chamber 6 into the turbine unit 11 and by means of the rotor blades 15 drives the rotor 3 of the gas turbine 1 which drives the compressor 5 and a working machine such as a generator.

The torque acting on the rotor blades of the turbine unit and produced by the working medium is transmitted to the generator as useful energy and to the compressor as driving energy for the compressing of the ambient air. Consequently, the hollow shaft has to transmit the driving energy required for the compressing of the ambient air in the compressor from the turbine disk of the first turbine stage to the compressor disk of the last compressor stage.

This arrangement inside the turbine causes the hollow shaft to be subjected to especially high mechanical loads. These loads can lead to creep deformations and to defects which then lead to a reduction of the service life of the rotor.

In addition, lying radially adjacent to the hollow shaft is the combustion chamber of the gas turbine which can unacceptably heat this axial region of the rotor during operation. Therefore, thermal loads also can occur which can diminish the strength as also the rigidity of the hollow shaft so that the occurring mechanical load induces a premature fatigue of the material of the hollow shaft.

Moreover, from GB 836,920 a rotor for a compressor is known which is formed from a plurality of abutting, clamped compressor disks. The compressor disks have a central opening which forms a hollow shaft.

Furthermore, GB 661,078 shows a hollow shaft for a gas turbine rotor which is formed from two abutting tubular pieces radially inside the combustion chamber.

SUMMARY OF THE INVENTION

The object of the invention is to specify a rotor for a turbo-engine which has a longer service life and a lower susceptibility to mechanical defects. In addition, an object of the invention is to specify for this a turbo-engine.

The problem focused on the rotor is resolved by the features of the claims. Advantageous developments are specified in the dependent claims.

With regard to the rotor, the invention with the rotor referred to at the beginning provides that each ring is constructed I-shaped in cross section, wherein the web of the I-shape extends in the radial direction of the rotor.

The invention is based on the consideration that the both mechanically and thermally highly loaded hollow shaft in the region of the combustion chamber is replaced by a plurality of abutting and comparatively short in the axial direction rings. By this fundamental, constructional design the mechanical stresses can be significantly reduced. In the region of the rings with high material temperatures which arise on account of the radially farther outwards located combustion chamber the stresses and the creep deformations possibly resulting from it are reduced. Consequently, the service life of each ring is extended.

Previously, the hollow shaft by transmission of the energy required by the compressor was especially torsion-stressed over its axial length. By means of the invention the axial length of a ring in relation to the hitherto constructional length of the hollow shaft is greatly shortened so that each ring is considerably less torsion-stressed. Hence, by the invention the mechanical loads are further reduced.

Furthermore, the rings by their webs extending in the radial direction bring about by an interposed additional cavity an improved thermal insulation of the central cavity in relation to a radially farther outwards lying outer region so that colder air in the cavity acts upon the surfaces of the component. Consequently, the sections with especially high mechanical loads during the running of the turbo-engine are operated below a transition temperature (activation energy) required for, creeping so that especially at this point creep deformations can be avoided. Thus, the thermal load of the rings will be further reduced which enables a higher mechanical load.

Moreover, the I-shaped cross section of the rings enables an especially rigid, light and mechanically loadable design of the ring.

On top of this, the general striving for the reduction of manufacturing costs can be taken into account as because of the lower stress a more cost-effective material, such as 26NiCrMo26145 mod, can be used for the rings compared with the material for a one-piece hollow shaft from the prior art.

According to a development of the invention the rotor has at least one tension bolt extending parallel to the rotational axis. The sections of the rotor are each formed by a disk, wherein the at least one tension bolt for the clamping of the disks and the rings extends through these. This component-like construction of the rotor enables in the unlikely case of a defect on the ring or on a disk the replacing of the subjected component.

In an especially advantageous development of the invention the tension bolt extends centrally through the disks and through the rings. Therefore, the tension bolt installed centrally to the rotational axis can clamp the stacked rings and disks of the compressor and of the turbine unit and simultaneously can be used for the axial and radial supporting of the rotor.

Within the scope of an advantageous development the rotor has a plurality of tension bolts spaced away from the rotational axis which extend through the disks and the rings. The use of the multi-piece constructed hollow shaft is consequently also applicable to rotors which provide the clamping by a plurality of tension bolts.

According to an especially preferred development each ring and each section has positive-locking means for the transmission of the torque of the rotor from one of the two sections to the oppositely disposed section. A loss-affected relative movement known as slip in the circumferential direction between the directly adjacent rings or between one ring and one section as the case may be can, therefore, be effectively avoided.

Expediently the means for the transmission of the torque to the end faces of the ring and to those of the sections are constructed as face serrations in the fashion of a Hirth-type toothing. This form-fitting toothing enables a slip-free operation of the rotor. In particular, if one of the two sections is constructed as a compressor disk and the other as a turbine disk the power required for the compressing of the drawn-in ambient air at the compressor is transmitted loss-free from the turbine unit to the compressor by means of the rings installed in between.

In an especially preferred embodiment a flange extending in each case in the axial direction is installed on each end of the web so that between two adjacent rings and between their radially inner flanges and their radially outer flanges an additional cavity is formed. This enables a spatial separation of a radially outer lying and comparatively hot outer region in the region of the combustion chamber from a central cavity enclosed by the rings. The heat yield from the outer region into the rings, especially into the radially inner flanges of the rings, can be reduced as the additional cavity insulates the central cavity in relation to the outer region so that colder air in the cavity acts upon the surfaces of the component.

Regardless of whether the additional cavity is used as a non-flow-washed insulating cavity or for the guiding of an additional cooling fluid the additional cavities can be at least partially in flow communication with one another by passages located in the webs. Either the connections between two adjacent additional cavities lead to a quicker and more uniform insulating action or they serve as communication passages for the cooling medium if the latter in the form of compressor air is feedable into the additional cavity on the compressor side and extractable on the turbine side. With this, the compressor air in the compressor can pass either through bleed holes located in the rotor or behind the compressor via a suitable device.

These developments lead in each case to a temperature lowering of the ring material so that detrimental creep deformations are avoided.

In addition, the cavity in the axial direction is flow-washable by a cooling medium. In this case, the rings and the sections have labyrinth-like sealing means for the sealing of the cavity. As the rings reciprocally and in relation to the sections externally seal the cavity the cooling air can be guided loss-free from the compressor through the cavity to the turbine unit without leaks occurring. The sealing means in this respect can be provided on the flanges of the rings upon which no means for the transmission of the torque are provided. Therefore, one flange of the ring in its radial material thickness can be designed comparatively wide which then transmits the torque, and the other flange can be designed comparatively narrow which then serves exclusively for the sealing of the cavity externally and for the forming of the additional cavity.

Further to this, the cooling air cools the rings so that the average component temperature is reduced.

The invention for the solution of the problem focused on the turbo-engine referred to at the beginning states that the rotor is constructed as claimed in one of the claims.

Especially advantageous is the development in which the turbo-engine is constructed as a gas turbine and in which the gas turbine has in series along the rotor a compressor, at least one combustion chamber and a turbine unit, wherein one of the two sections is formed by a compressor disk installed in the compressor and the other section is formed by a turbine disk installed in the turbine unit.

Moreover, the advantages described for the rotor are analogically valid for the turbo-engine.

BRIEF DESCRIPTION OF THE DRAWINGS

The invention is illustrated on the basis of a drawing. In the drawing.

DETAILED DESCRIPTION OF THE INVENTION

Figure 4:
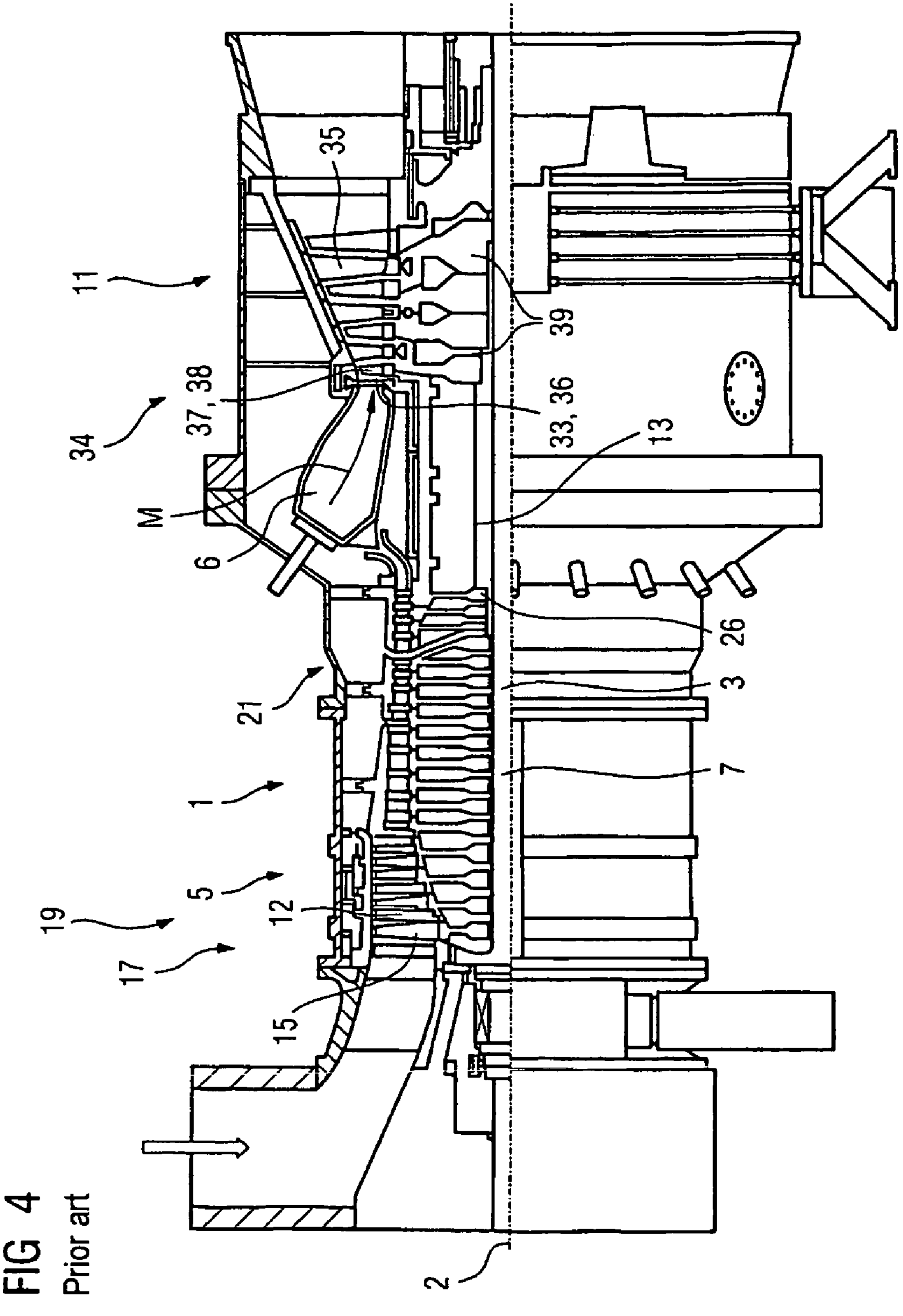
FIG 4 Prior art
FIG. 4 shows a gas turbine according to the prior art in a longitudinal partial section.
Figure 5:
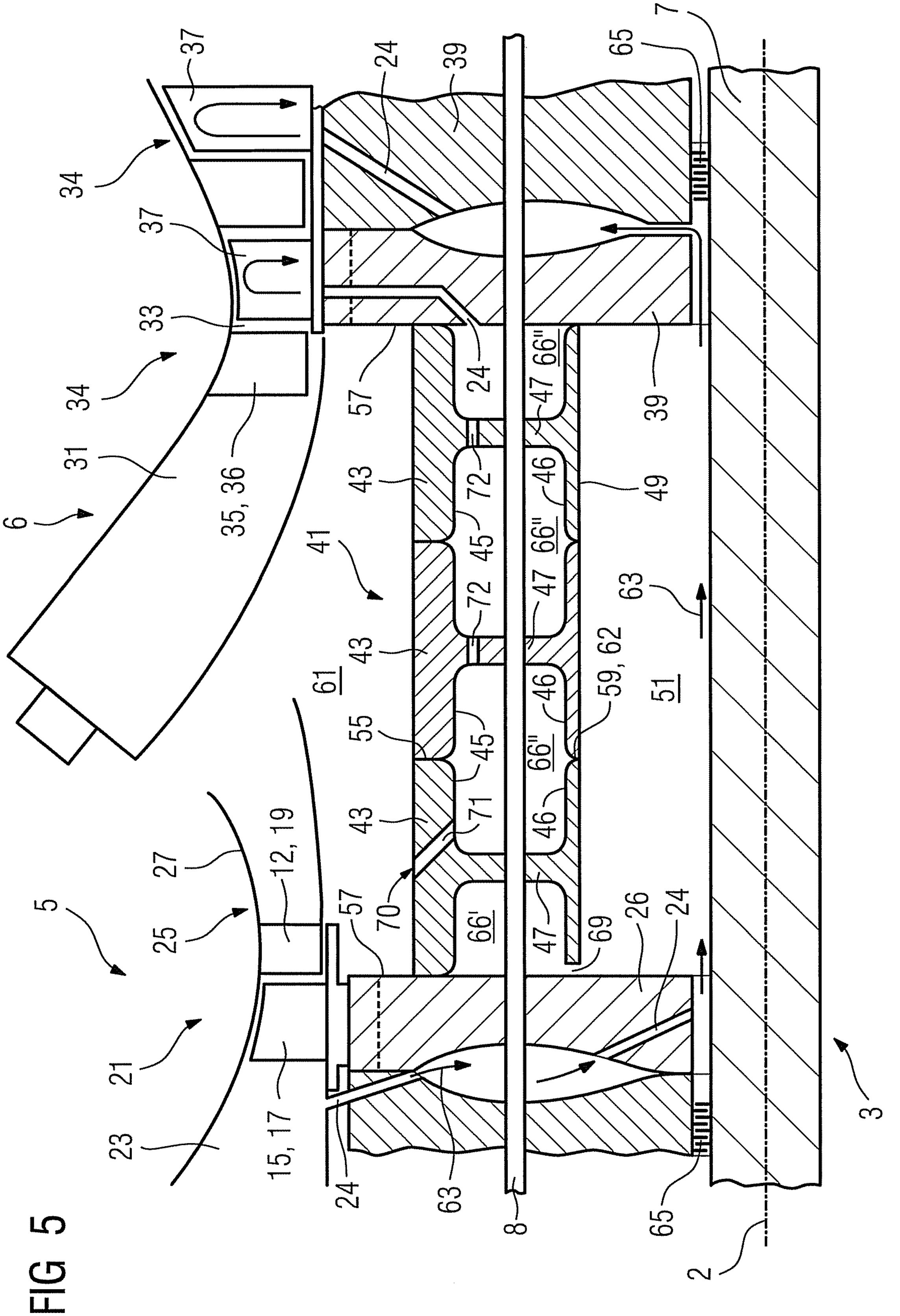
FIG. 5 shows another embodiment of a rotor of a gas turbine in accordance to the present invention.

FIG. 4 shows a gas turbine 1 constructed according to the prior art described previously.

Figure 1:
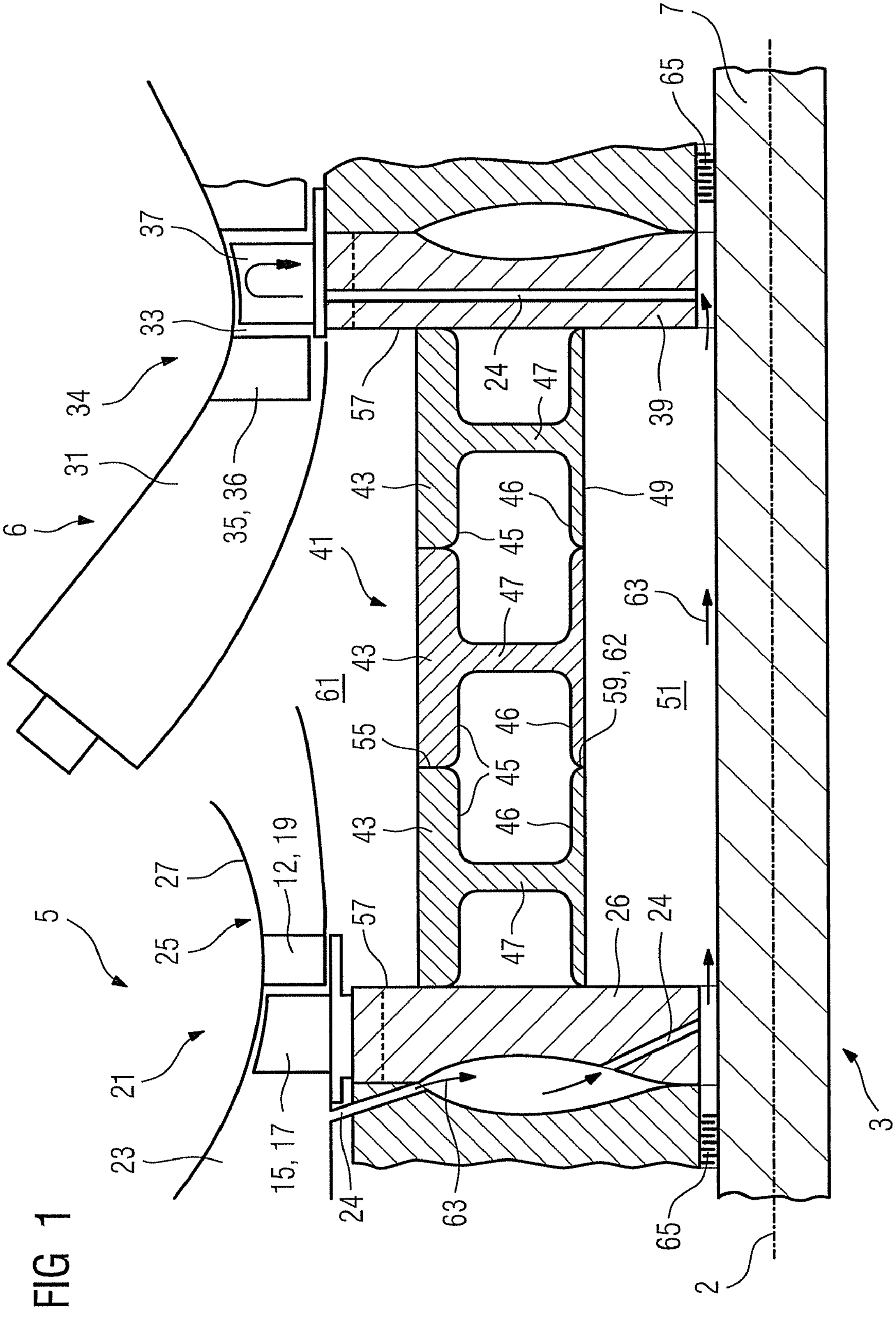
FIG. 1 shows a rotor of a gas turbine with a central tension bolt in a longitudinal section in the region between the compressor and turbine unit.

FIG. 1 shows a rotor 3 of a gas turbine 1 with a central tension bolt 7 in a longitudinal section in the region between the compressor 5 and turbine unit 11. From the compressor 5 is shown a flow passage 23 with only the last compressor stage 21. Along the rotor 3 rotatable around the rotational axis 2 there follows a compressor outlet 25, a diffuser 27 and a combustion chamber 29. The latter has a combustion chamber 31 which opens into a hot gas passage 33 of a turbine unit 11.

In the flow passage 23 of the compressor 5 torsionally fixed stator blades 12 are fastened in rings 19. Connected ahead of these are rotor blades 15 which are installed on the rotor 3 by means of a compressor disk 26.

The hot gas passage 33 has stator blades 35 and further downstream rotor blades 37. The stationary stator blades 35 are connected to the casing of the gas turbine 1, whereas the rotor blades 37 are fastened on a turbine disk 39.

The rotor 3 has three axially consecutive rings 43 between the compressor disk 26 and the turbine disk 39 instead of the one-piece hollow shaft made known from the prior art. In this case, each ring 43 is I-shaped in cross section so that two flanges 45,46 extending in the axial direction of the tension bolt 7 are interconnected by a web 47 extending in the radial direction.

Between the outside circumference of the central tension bolt 7 and an inner surface 49 formed by the radially inner flanges 46 a central cavity 51 extending in the axial direction is formed which is suitable for the guiding of a cooling fluid, especially compressor air. With the development of the rotor 3 with a central tension bolt 7 shown in FIG. 1 the cavity 51 is annular in cross section.

On the end faces 55 of the radially outer-lying flanges 45 is installed the Hirth-type toothing by which the torque of the rotor 3 is transmitted from the turbine disk 39 via the rings 43 to the compressor disk 26. For this, the end faces 57 of the turbine disk 39 and of the compressor disk 26 similarly have Hirth-type toothing.

The radially inner-lying flanges 46 of the rings 43 have on their end faces 59 labyrinth-like seals 62 which seal the cavity 51 from the outer-lying region 61.

As the outer-lying flanges 45 transfer the torque from one end face 55 to its oppositely disposed end face 55 the outer flanges 45 in the radial direction have a greater width than as on the inner flanges 46 which merely support the seals 62.

During the running of the gas turbine 1 air from the compressor 5 is compressed in the flow passage 23 of the compressor 5, wherein a portion of the compressed air is extracted through disk holes 24 as cooling air and in accordance with the arrows 63 is guided along the tension bolt 7 from the compressor side end of the cavity 51 to the turbine side end. Disk holes 24 located in the turbine disk 39 from the inside diameter to the outside diameter guide the cooling air to the rotor blades 37 of the first turbine stage 34. The cooling air cools the rotor blades 37 and then escapes into the hot gas passage 33.

The labyrinth-like seals 65 and the seals 62 provided between the tension bolt 7 and disks 26,39 prevent an escape of the cooling air from the cavity 51.

Figure 2:
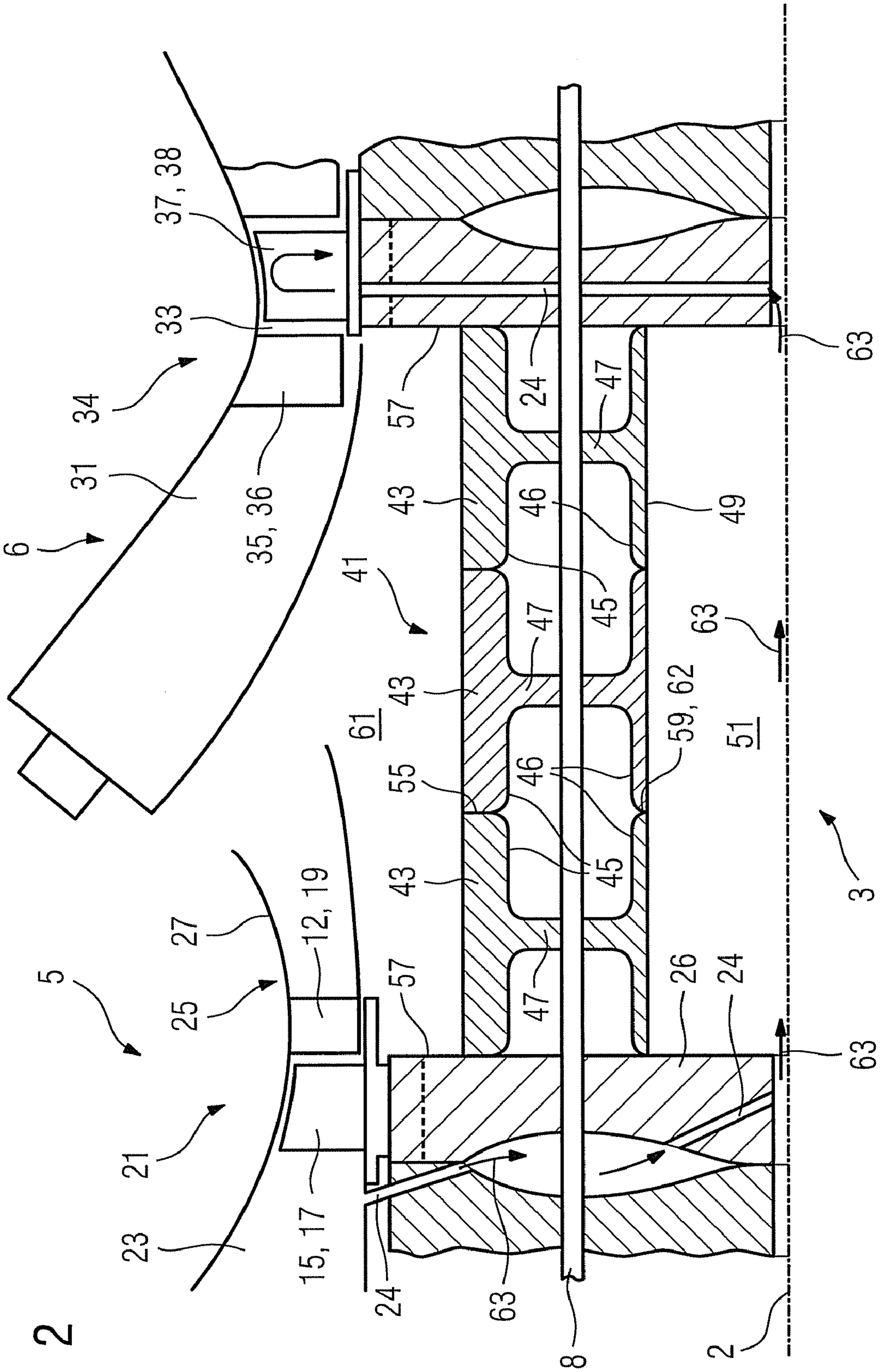
FIG. 2 shows a rotor of a gas turbine with a plurality of tension bolts in a longitudinal section in the region between the compressor and turbine unit.

FIG. 2 shows a rotor 3 of a gas turbine 1 with a plurality of tension bolts 8 in a longitudinal section in the region between the compressor 5 and turbine unit 11.

Like FIG. 1, FIG. 2 shows the compressor 5, the combustion chamber 6, the turbine unit 11 and the rotor 3 assembled from compressor disks 26, turbine disks 39 and rings 43. Instead of the central tension bolt 7 shown in FIG. 1, in FIG. 2 is shown one of a plurality of decentralized tension bolts 8 spaced away from the rotational axis 2. The decentralized tension bolt 8 is therein spaced away from the rotational axis 2 in such a way that the webs 47 of the rings 43 are penetrated by it. Alternatively to that end the spacing could also be selected so that the tension bolt 8 passes through the flanges 45 of the rings.

Figure 3:
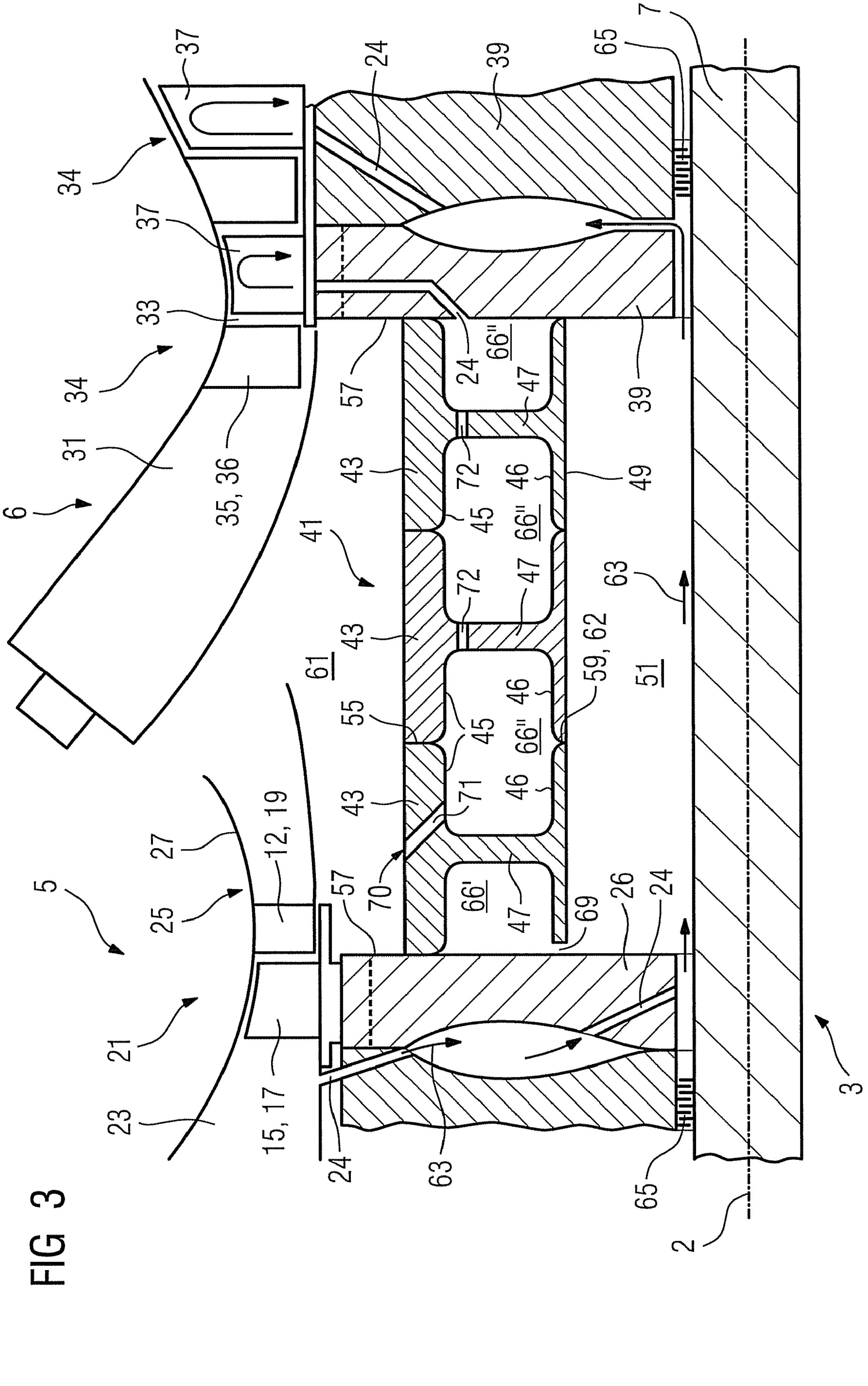
FIG. 3 shows an alternatively designed rotor of a gas turbine with a central tension bolt in a longitudinal section in the region between the compressor and turbine unit.

Deviating from FIG. 1, FIG. 3 shows a rotor clamped by a central tension bolt in which, for example, holes 71 can be provided in a radially outer flange 45 of the ring 43 located on the compressor side by which still comparatively cool compressor end air is guidable into a cavity 66" formed between the radially inner and radially outer flanges 45,46.

This leads to a more uniform and quicker temperature regulation of the rotor 3 which can be used for the positive influencing of the radial gap formed by the rotor blades and guide rings. The cooling air flowing into the additional cavity 66" is guided through passages 72 located in the webs 47 in the direction of the turbine unit and then guided through disk holes 24 to the turbine blades 27 of the first turbine stage where it can be used as cooling air.

The central cavity 51 serves in this case as a supply passage for cooling air for the turbine blades 37 for the second turbine stage 34.

It can be optionally possible for there to be a gap 69 between the compressor disk 26 and the radially inner flange 46 of the ring 43 bearing upon it in order to bring about a concentrated feed of cooling air into an additional cavity 66' radially bounded by the flanges 45,46.

The invention claimed is:

1. A hollow-shaft rotor for a turbo-engine, comprising:

a first shaft section arranged coaxially with a rotational axis of the engine having a first end surface and formed from a plurality of abutting first section disks;

a second shaft section arranged coaxially and downstream of the first shaft section having a second end surface and formed from a plurality of abutting second section disks wherein the first and second end surfaces face each other; and a third shaft section arranged coaxially with and between the first and second shaft sections wherein the third shaft section comprises a plurality of axially abutting ring segments, each segment having an I-shaped cross section with:

a web section extending in a radial direction having a radially outer end and a radially inner end, an upper flange section extending from the radially outer end of the web in an axial direction toward both the first and second end surfaces, and a lower flange section extending from the radially inner end of the web in the axial direction toward both the first and second end surfaces, wherein a shaft cavity formed between the radially inner and radially outer flanges where two or more adjacent ring segments join, and a second shaft cavity bounded by the inner diameter surfaces of the lower flange sections and the first and second end surfaces.

2. The rotor as claimed in claim 1, wherein the first shaft section is a compressor section and the second shaft section is a turbine section.

3. The rotor as claimed in claim 1, further comprising a tension bolt parallel to the rotational axis and extending through the plurality of first section disks, second section disks and ring segments.

4. The rotor as claimed in claim 3, wherein the rotor further comprises a plurality of tension bolts that extend through the plurality of first section disks, second section disks and ring segments.

5. The rotor as claimed in claim 4, wherein the plurality of tension bolts are spaced away from the rotational axis of the engine.

6. The rotor as claimed in claim 5, wherein each section disk and ring segment comprises a Hirth-type toothing for the transmission of the rotor torque.

7. The rotor as claimed in claim 6, wherein the third shaft cavity guides a cooling fluid.

8. The rotor as claimed in claim 7, wherein a plurality of third shaft cavities are in flow communication with one another through passages located in each ring web section.

9. The rotor as claimed in claim 8, wherein the cooling fluid is a compressed air extracted from a compressor of the engine.

10. The rotor as claimed in claim 9, wherein the extracted compressed air is directed to the third shaft cavity which is then extracted in a region of a turbine stage.

11. The rotor as claimed in claim 10, wherein the Hirth-type toothing is arranged on mating ends of the ring segments.

12. The rotor as claimed in claim 11, wherein a plurality of labyrinth seals arranged between respective inner diameter surfaces of the first and second rotor sections and an outer surface of the tension bolt seal the fourth cavity.

13. A combustion turbine engine, comprising:

a rotor mounted coaxially with a rotational axis of the engine having a compressor shaft section arranged coaxially with the rotational axis of the engine and having a first end surface and formed from a plurality of abutting compressor disks;

a turbine shaft section arranged coaxially and downstream of the compressor shaft section having a second end surface and formed from a plurality of abutting turbine disks wherein the first and second end surfaces face each other; and an intermediate shaft section arranged coaxially with and between the compressor and turbine shaft sections wherein the intermediate shaft section comprises a plurality of axially abutting ring segments, each segment having an I-shaped cross section with:

a web section extending in the radial direction having a radially outer end and a radially inner end, an upper flange section extending from the radially outer end of the web in the axial direction toward both the first and second end surfaces, and a lower flange section extending from the radially inner end of the web in the axial direction toward both the first and second end surfaces wherein an intermediate shaft cavity formed between the radially inner and radially outer flanges where two or more adjacent ring segments join, and a cavity bounded by the inner diameter surfaces of the lower flange sections and the first and second end surfaces;

an inlet that admits a working fluid;

a compressor that compresses the working fluid and surrounds the compressor shaft section;

a combustion section that receives the compressed working fluid and combusts a fuel to produce a hot working fluid; and a turbine that expands the hot working fluid and surrounds the turbine shaft section.

* * * * *